Figures 1, 2, 3, 4:
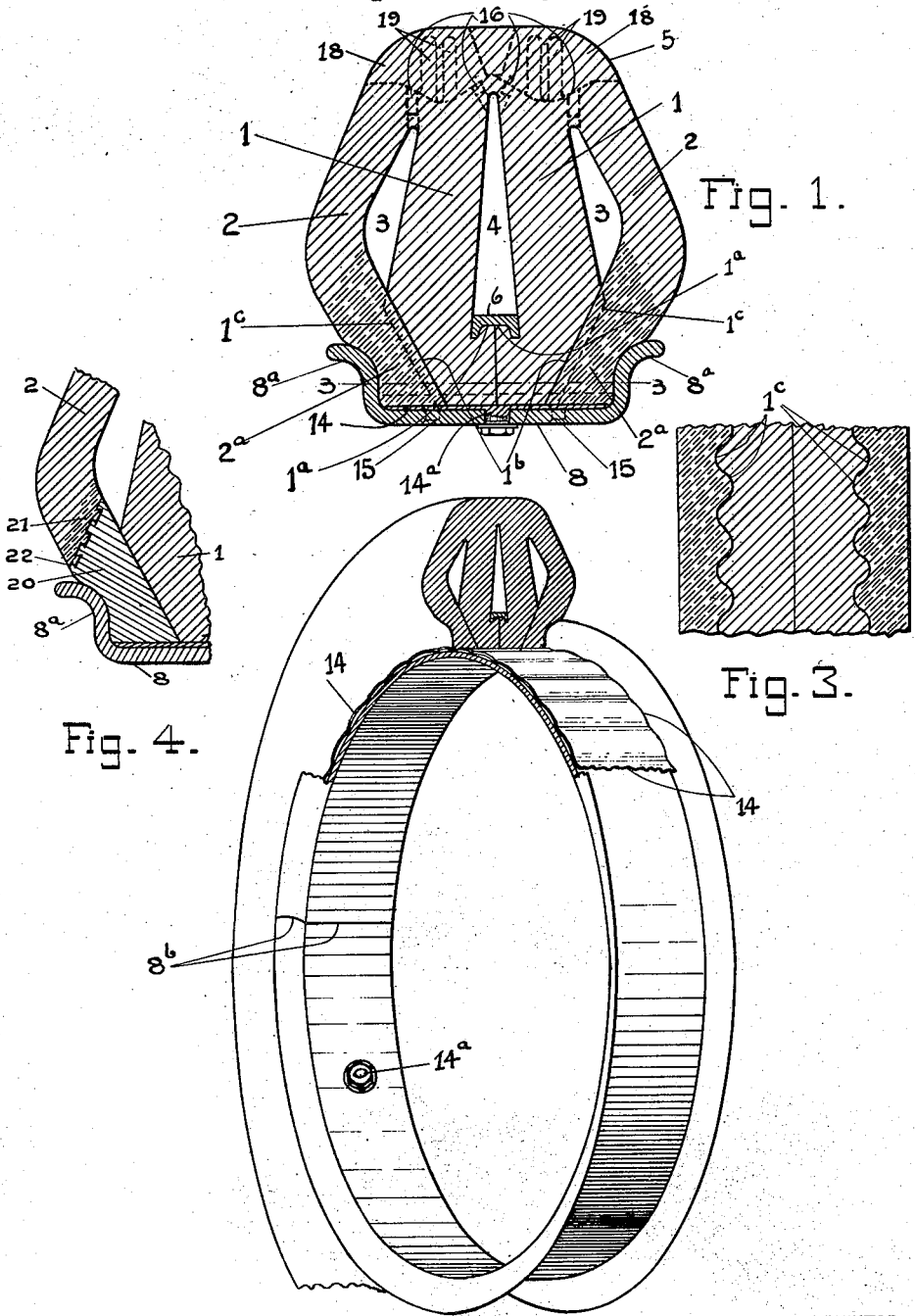

Feb. 15, 1927.

M. C. OVERMAN

CUSHION TIRE

Original Filed Sept. 13, 1921

1,618,129

INVENTOR
Max Cyrus Overman
BY
E. W. Scherr Jr. ATTORNEY

Patented Feb. 15, 1927.

1,618,129

UNITED STATES PATENT OFFICE.

MAX CYRUS OVERMAN, OF NEW YORK, N. Y., ASSIGNOR TO O. & W. COMPANY, A CORPORATION OF NEW YORK.

CUSHION TIRE.

Application filed September 13, 1921, Serial No. 500,368. Renewed June 11, 1926.

My present invention relates to improvements on the cushion tire of my co-pending application Serial No. 500,367 filed on even date comprising (1) making the basal limbs of the outer members of a firmer, less yielding material as by vulcanizing said parts to a greater extent than the tread portions of said members; (2) providing more positive means for preventing the inner and outer load-supporting and shock-absorbing members from creeping circumferentially relatively to one another; also relatively to the rim; (3) providing vents for connecting the spaces in the tire with the outer air or atmosphere.

These and other features and advantages of my present tire will appear from an understanding of the following description read in connection with the drawings which purport to show only the preferred embodiment of my present improvements, although, of course, other embodiments are possible within the scope of my invention.

In the drawings, Fig. 1 is a cross-sectional view through my improved tire and tire rim; Fig. 2 is a perspective view of a severed length of the tire on the tire rim, parts also of the latter being broken away to reveal the structure; Fig. 3 is a horizontal sectional view on the line 3—3 through the tire in Fig. 1, and Fig. 4 is a fragmentary view of a modified tire which otherwise corresponds with Fig. 1.

Briefly, the tire of my present invention has the following in common with the tire of my aforesaid co-pending application: It has upright load-supporting and shock-absorbing inner members 1—1 and laterally stabilizing or bracing outer members 2—2. These members are relatively closely adjacent, separated by proper spaces, two of which 3—3 are similar in cross-section, and a third space being designated 4.

The tread-portions of all these members are integrally united by a relatively wide tread-portion 5 including sides which are divergent toward the base of the tire. This provides a tread portion whose outline resembles that of a pneumatic tire in ground contact and like that tire resists penetrating into a soft roadway and adds to its ability to climb out of ruts; etc, The aforesaid load-supporting and shock-absorbing inner members 1—1 are comparatively tall and thin; and in vertical direction adjacent the spaces 3 and 4 are substantially straight and steeply converge toward the tread, the result of their convergence being that the opening 4 in cross-section is substantially V-shaped, the basal part thereof being closed by shoulders 1ª—1ª on the base portions of said members.

The laterally stabilizing or bracing outer members 2—2 in cross-section are each elbow-shaped, their tread limbs converging toward the tread and their basal limbs toward the rim-engaging portion of the tire. The result is that each of the spaces 3 in cross-section is substantially an obtuse angled triangle with its longest side formed by the side of the adjacent inner member 1.

The respective members 1—1, 2—2 and spaces 3—3 and 4 may be circumferentially continuous around the tire. Also the whole tire is preferably molded as an entirety. The material is, of course, rubber or rubber compound or other suitable rubber-like material with or without fabric reinforcings and the like.

I construct a narrow base for this tire to fit a standard pneumatic tire rim and secure it thereto by adaptations and means as follows: The basal portions of the inner upright members 1—1 are formed with shoulders 1ᵇ—1ᵇ, which may be inclined, and which overlie complementary basal portions 2ª—2ª on the outer members when all of the members are together with the tire in operative position on the rim. The foregoing coupled with the elbow-shape of the outer members 2—2 provides the narrow base for the tire.

6 is a channel-sectioned metal ring which is put into the cavity 4 after the tire has been molded. The inner members 1—1 of the tire are then brought together as in Figs. 1 and 2 so that the ring bears upon and its sides enclose both of the shoulders 1ª—1ª on said members 1—1 for securing the tire to the rim as will be explained later.

8 is a standard pneumatic tire rim having side flanges 8ª—8ª. The flange-space is adapted to receive snugly the above described basal portions of the members 1 and 2 as in Fig. 1, with the outwardly curving flanges supporting the elbow-shaped outer members 2.

This standard flanged rim 8 is circumferentially discontinuous, being transversely severed at 8ᵇ (Fig. 2). This permits the rim to be contracted to apply it to the tire, after which it can be expanded into the position shown with the base of the tire seated in the rim-space.

Any form of expansible rim may be employed; also any suitable means for locking the rim in its expanded condition, for example, that shown in my said co-pending application. For simplicity, no locking means is shown in my present application.

The inside diameter of the ring 6 is sufficiently small so that when the rim is fully expanded, the basal portions of the inner members 1—1 will be securely clamped between said ring and the rim. At the same time, the portions of said inner members that overlie the basal portions of the outer members 2—2 will securely clamp the latter to the rim and the adjacent flanges.

Also, my present tire may be used on other rims including any standard form of detachable rim for pneumatic tires, as explained in my said co-pending application.

For a tire to possess good riding qualities when used on a high speed motor-vehicle it is necesary that it be not only highly and resiliently yielding so as to absorb to the maximum extent the inequalities of the road surface, but also it should be sufficiently rapid in its action to yield to the inequalities of the road as rapidly as they are met with in the rapidly rolling passage of the tire over the roadway. In a pneumatic tire the cushioning medium is the compressed air contained in the tire, and as air possesses a low inertia and a low resistance to flow, such a tire is able to act very quickly in yielding to the rapidly occurring road irregularities which are met with in a vehicle travelling at a high speed on the roadway.

On the other hand, in making a non-inflated tire out of a material such as rubber, rubber compounds, or the like, the cushioning effect of the tire must for satisfactory results be produced by the flow of the material itself of which the tire is formed. The rate of flow of any solid material such as rubber, rubber compounds, or other like materials, is much slower than that of air, or other gases. It is necessary, therefore, in producing a tire having cushioning effects and acting substantially as quickly as a pneumatic tire, that the rubber, or other material of which it is composed, shall be so arranged that in giving the cushioning action through an actual flow of the material it will have the shortest distance through which to flow. Furthermore, it is necessary, in using rubber compounds having relatively freely-flowing characteristics, that no portion of the material shall have to flow very far, or otherwise excessive heating from such flow is likely to occur, resulting in de-vulcanization. In order, therefore, for the tire to have the desired quickness of action in yielding to the road irregularities and quickly resuming its normal condition and at the same time permitting a maximum amount of yield or compression without excessive flowing movements of the material, the load-supporting members 1—1 of the tire should be relatively tall for a maximum total compression and relatively thin in cross section for quick action with free spaces into which said load-supporting members may expand so that the flow of the material will be largely perpendicular to the direction of the force acting on them. At the same time said load-supporting members 1—1 in yielding to the forces acting on them should compress and enlarge laterally without buckling and they therefore for maximum effectiveness should be substantially straight. Furthermore, since a tire in actual service on the roadway is subjected not only to forces acting vertically against its tread but also to lateral forces of considerable magnitude, it is necessary that either the load-supporting members themselves provide the tire with sufficient lateral stability to withstand such lateral forces as by being relatively thick and not too steeply convergent or that other members be provided co-acting with the load-supporting members to properly resist such lateral forces. In this present tire the load supporting members 1—1 are such that they act principally as such in order to enable them to have quickness of action to the higest degree as shock absorbers in cushioning the forces acting vertically with respect to the tread of the tire; and additional members, whose function is almost entirely that of properly resisting and cushioning the forces acting laterally with respect to the tire, are provided by the outer elbow-shaped members 2—2, which, besides giving lateral stability to the tire, also act in conjunction with the tread portion to give the tire the proper degree of resistance to road penetration to enable it to practically duplicate the pneumatic tire in this respect and in the respect of easily getting out of ruts, etc.

Fig. 1 shows tread openings 18—18 in the tread portion of the tire. These consist of transverse grooves or spaces open at the tread and extending transversely through the sides of the tread portion 5 to and beyond the center of the tread, adjacent spaces extending in overlapping fashion from opposite sides of said tread portion.

19—19 are spaced apart, integral projections from the body of the tread portion located within said grooves 18—18 to act as pebble ejectors.

I will now describe my present improvements by reference to the accompanying drawings showing same in the preferred form.

Referring to Fig. 1, it will be seen that the basal portions of the outer members 2—2 are more closely cross-lined or shaped than the remainder of the members. This indicates the portions that I vulcanize to a greater extent so that they have a stiffer, less yielding nature. This causes these portions to act as a firmer support for the outer portions of the members 2—2, through their greater resistance to bending; reduces the tendency of these elbowed members to spread outwardly at the elbows; and, due to their reduced compressibility, causes them to be clamped more certainly against pulling out from under the inner members. In short, the effectiveness of the outer members 2—2 in their laterally stabilizing or bracing function is greatly increased.

Complementary corrugations 1ᶜ are provided on the contacting faces of the inner and outer members at the base of the tire, as best shown in the horizontal sectional view Fig. 3, some of these corrugations being indicated by the dotted lines 1ᶜ and by the full lines 1ᵇ in Fig. 1. These complementary interlocking parts prevent the multiple members 1 and 2 from creeping longitudinally relatively to one another when the tire is in action or use.

For the same purpose and also to prevent the tire as an entirety from creeping circumferentially about the rim, I provide corrugations across the bottoms of all the members 1 and 2 complementary to those in a transversely corrugated strip 14 received in the bottom of the flanged rim space. The strip itself is prevented from creeping by being provided with a projection 14ᵃ (Fig. 1) received through the hole usually provided in the rim for the valve stem of the inner tube, its free-end being screw-threaded with a nut applied thereto; also this strip may be secured in place by rivets 15. The aforesaid corrugations in the harder material of the outer members 2 are especially effective in preventing creeping.

16—16 are vent-holes which under certain conditions I prefer to provide to connect the tire spaces with the outer air or atmosphere so that these are not dead-air spaces. In addition to allowing circulation of air into and out of said spaces, these vents also allow any possible accumulation of water to escape. For this purpose they are advantageously located toward the tread so that the water will be centrifugally removed through them. These vent-holes may be molded complete for their entire length; or as intended to be shown in Fig. 1 they may be molded for part of their length as shown by the full lines bounding said holes and thereafter said holes may be bored through and completed, as shown by the dotted lines, this to be done at the time it is desired that said vents shall become operative.

The ring 6 instead of having a plain clamping face as in my aforesaid co-pending application is provided with inwardly extending side-flanges as best shown in Fig. 1. These engage complementary recesses formed in the shoulders 1ᵃ—1ᵃ of the foot portions of the inner members 1—1, thereby more positively securing same to the rim by preventing said foot portions from working laterally out from under the clamping ring 6.

Fig. 4 shows a modification of the tire of Fig. 1, the modification consisting in stiffening the basal limbs of the outer or buttressing member 2—2 in another way than by vulcanizing them to a greater extent, said other way consisting in making the basal portions of said limbs either in whole or in part of a suitably different stiffer material than rubber, such as aluminum, iron or steel or of any other suitable material for the purpose.

Thus the basal portion of each outer member 2 of the tire may consist of an aluminum or steel ring shown cross-sectionally at 20 in Fig. 4. In making the tire, the rubber members 2—2 are vulcanized respectively to said metal base portions 20—20, the vulcanization being indicated in said Fig. 4 by the more closely lined or shaded portion 21.

Preferably, as in Fig. 1, the vulcanization does not extend to or include the elbows of the members 2—2. In consequence these elbows remain relatively soft and yielding, so as not to be broken by side contact with the curb of a side-walk or the like.

Except for the foregoing, I prefer for maximum stiffening and support, to extend the vulcanization in Fig. 1 or the combined metal reinforce and vulcanization in Fig. 4 well out to the tread-limbs of the members 2—2. The outer limits of the vulcanized portions are preferably inclined as shown in the drawings so as to converge toward the tread without including the outside or curb-contacting portions of the elbow—or equivalent lateral buttressing members.

The inclined outer portion of each metal ring 20 is preferably longitudinally grooved as shown at 22 in Fig. 4, so that the rubber portions of the members 2—2 can be all the more effectually vulcanized or united thereto.

Some of the foregoing improvements may be used without others. Also other changes and modifications may be made in the practical embodiment of my present improvements which will nevertheless still be within the spirit of the foregoing disclosure and within the meaning and spirit of the annexed claims and which as such are accordingly intended to be covered thereby.

The expressions herein such as "upright" and "up and down" applied to the load-supporting walls, etc., of the tire, and other expressions of direction applied to parts of the tire, are to be taken as referring to a section of the tire located as if in running tread contact with the ground.

What I claim is:

1. In a tire, the combination of a tread-portion, inner and outer members united with said tread-portion and separated from one another by spaces, the inner between said spaces being upright and substantially straight so as to be load-supporting and the outer being laterally stabilizing elbow-shaped members containing the inner members between them with the elbows at the sides of the tire and with their limbs converging toward the tread portion and toward the base of the tire respectively, the basal portions of all the said members being adapted to be contained in a flanged tire-rim with the elbow-shaped members braced by said flanges, the basal limbs of said outer members consisting of firmer, more unyielding material than the tread limbs of said members.

2. In a tire, the combination of a tread-portion, space-separated load-supporting and shock-absorbing inner members which converge toward and unite with said tread-portion and which in up and down direction are substantially straight adjacent said space, elbow-shaped laterally stabilizing outer members containing the inner members between them with one set of their limbs converging toward and uniting with said tread portion and with their other set of limbs converging toward the base of the tire, the basal portions of all of the said members being adapted to be contained in a flanged tire-rim with the elbow-shaped members braced by said flanges, the basal limbs of said outer members consisting of firmer, more unyielding material than the tread limbs of said members.

3. In a tire, the combination of a tread-portion, space-separated load-supporting and shock-absorbing inner members which unite with said tread-portion and which in up and down direction are substantially straight adjacent said space, elbow-shaped laterally stabilizing outer members containing the inner members between them with one set of their limbs converging toward and uniting with said tread-portion and with their other set of limbs converging toward the base of the tire, the basal portions of all of the said members being adapted to be contained in a flanged tire-rim, said portions of the inner members being adapted to be engaged by means for securing them to said rim and further being adapted to overlie and secure the basal portions of the outer members also to the rim, the basal limbs of said outer members consisting of firmer, more unyielding material than the tread limbs of said members.

4. In a tire, the combination of spaced inner and outer members, a tread-portion integrally uniting the tread portions of said members, the basal portions of said members being adapted to be contained in a flanged tire-rim, the basal portions of the inner members being adapted to be engaged by means for securing them to said rim and further being adapted to overlie the basal portions of the outer members so as to secure the latter also to the rim, said basal portions of the outer members consisting of firmer, more unyielding material than the tread-portions of said members.

5. In a tire, the combination of spaced inner and outer members, the former being upright load-supporting members, the latter being lateral buttressing members, a tread portion integrally uniting the tread portions of said members, the basal portions of said members being adapted to be contained in a flanged tire-rim, the basal portions of the outer members consisting of firmer, more unyielding material than the tread portions of said members.

6. In a tire, the combination of spaced, inner and outer members integrally united by a thread portion, said outer members being elbow-shaped in cross-section with the elbows directed outwardly from the sides of the tire and with their limbs converging toward the tread and the base of the tire respectively, the basal portions of said outer members consisting of firmer, more unyielding material than the tread portions of said members.

7. In a tire, the combination of spaced, inner and outer members, a tread portion integrally uniting the tread portions of said members, the basal portions of said members being adapted to be contained in a flanged tire-rim, and complementary interlocking parts on the sides of the basal portions of the inner and outer members preventing longitudinal creeping of said members on one another.

8. In a tire, the combination of spaced, inner and outer members, a tread portion integrally uniting the tread portions of said members the basal portions of said members being adapted to be contained in a flanged tire-rim, the basal portions of the inner members being adapted to be engaged by means for securing them to the tire-rim and further being adapted to overlie the basal portions of the outer members so as to secure the latter also to the rim, and complementary interlocking parts on the sides of the basal portions of the inner and outer members preventing longitudinal creeping of said members on one another.

9. In a tire, the combination of spaced, inner and outer members integrally united by a tread portion, said outer members being elbow-shaped in cross-section with the elbows directed outwardly from the sides of the tire and with their limbs converging toward the tread and the base of the tire respectively, the basal portions of said outer members consisting of firmer, more unyielding material than the tread portions of said members, which more unyielding material does not extend to the outside portions of said elbows.

10. In a tire, the combination of spaced, inner and outer members integrally united by a tread portion, said outer members being elbow-shaped in cross-section with the elbows directed outwardly from the sides of the tire and with their limbs converging toward the tread and the base of the tire respectively, the basal portions of said outer members consisting of firmer, more unyielding material than the tread portions of said members, the outer limits of said material of the outer members converging toward the tread and not extending to the outside portions of said elbows.

11. In a tire, the combination of spaced, inner and outer members integrally united by a tread portion, said outer members being elbow-shaped in cross-section with the elbows directed outwardly from the sides of the tire and with their limbs converging toward the tread and the base of the tire respectively, the basal portions of said outer members being firmer and more unyielding than the tread portions of said members.

12. In a tire, the combination of spaced inner and outer members, a tread portion integrally uniting the tread portions of said members, the basal portions of said members being adapted to be contained in a flanged tire rim, radially compressing means for compressing the basal portions of the inner members against the base of said rim, and means for securing the basal portions of the inner and outer members against circumferential motion on one another.

13. In a tire, the combination of spaced inner and outer members, a tread portion integrally uniting the tread portions of said members, the basal portions of said members being adapted to be contained in a flanged tire rim, and a channel-sectioned ring in the space between the inner members with its channel engaging the basal portions of said members, and radially compressing same against the base of the tire rim.

14. In a tire, the combination of a tread portion, laterally spaced multiple inner and multiple outer members integrally formed with said tread portion and diverging immediately therefrom towards the base of the tire with expansion spaces separating said members adjacent said tread portion, the basal portions of said members meeting in the basal portion of the tire; and endless compression ring means in the space between the inner members, said ring means having side flanges which are recessed into said basal portion of the tire.

15. In a tire, the combination of a tread portion, laterally spaced multiple inner and multiple outer members joined by said tread portion, the basal portions of said members meeting in the basal portion of the tire, the basal portions of the inner members coming together separably at the space separating said members; and flanged ring means in said space between the inner members for compressing their basal portions between said means and a tire rim with the flanges of said ring means recessed into said basal portions of said inner members.

Signed at New York in the county of New York and State of New York this 12th day of September, A. D. 1921.

MAX CYRUS OVERMAN.